United States Patent
Collins et al.

(10) Patent No.: US 10,823,016 B2
(45) Date of Patent: Nov. 3, 2020

(54) SYSTEM AND METHOD FOR RISK CATEGORIZATION

(71) Applicant: General Electric Company, Schenectady, NY (US)

(72) Inventors: Timothy Robert Collins, Greer, SC (US); Paul Steven Dimascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 769 days.

(21) Appl. No.: 15/612,436

(22) Filed: Jun. 2, 2017

(65) Prior Publication Data

US 2018/0347408 A1 Dec. 6, 2018

(51) Int. Cl.
*F01K 23/10* (2006.01)
*G06Q 10/06* (2012.01)
*G05B 23/02* (2006.01)
*F01K 13/02* (2006.01)
*F01D 21/00* (2006.01)
*G05B 19/042* (2006.01)

(52) U.S. Cl.
CPC ............ *F01K 23/101* (2013.01); *F01D 21/00* (2013.01); *F01K 13/02* (2013.01); *G05B 23/0243* (2013.01); *G05B 23/0275* (2013.01); *G06Q 10/0635* (2013.01); *F05D 2260/81* (2013.01); *F05D 2260/82* (2013.01); *F05D 2270/09* (2013.01); *F05D 2270/11* (2013.01); *G05B 19/042* (2013.01)

(58) Field of Classification Search
USPC ........................................................ 702/184
See application file for complete search history.

(56) References Cited

U.S. PATENT DOCUMENTS

| | | | |
|---|---|---|---|
| 6,343,251 B1 * | 1/2002 | Herron ..................... | F02C 9/00 701/100 |
| 7,254,747 B2 | 8/2007 | Osborn et al. | |
| 8,756,092 B1 | 6/2014 | Marsten | |
| 9,569,397 B2 | 2/2017 | Higgins et al. | |
| 2012/0051911 A1 * | 3/2012 | Baik ................... | G01M 5/0033 416/61 |
| 2013/0173325 A1 * | 7/2013 | Coleman .......... | G06Q 10/06315 705/7.22 |
| 2016/0026739 A1 * | 1/2016 | Chopra .................... | G07C 3/14 703/2 |
| 2016/0139029 A1 | 5/2016 | Belsom et al. | |
| 2016/0245686 A1 * | 8/2016 | Pal ......................... | G01H 1/003 |
| 2016/0246287 A1 * | 8/2016 | Modgil .............. | G05B 23/0245 |
| 2016/0313216 A1 * | 10/2016 | Pal ......................... | G01D 7/005 |

(Continued)

*Primary Examiner* — Paul D Lee
(74) *Attorney, Agent, or Firm* — Fletcher Yoder P.C.

(57) ABSTRACT

In a first embodiment, a system includes a turbine system including turbomachinery, one or more processors, and a memory storing instructions. When executed by the one or more processors, the instructions are configured to cause the one or more processors to receive an operating parameter of the turbomachinery, and calculate a risk of failure for the turbomachinery based at least in part on an asset failure mode model. The instructions are also configured to cause the one or more processors to categorize the risk of failure as a selected failure indicator category of a plurality of failure indicator categories, and output the selected failure indicator category.

20 Claims, 5 Drawing Sheets

(56) References Cited

U.S. PATENT DOCUMENTS

| | | | |
|---|---|---|---|
| 2017/0236064 A1* | 8/2017 | Kirschnick | G06Q 10/06 702/35 |
| 2018/0218277 A1* | 8/2018 | Korsedal | G06N 7/005 |
| 2018/0231962 A1* | 8/2018 | Rasheed | G05B 23/0283 |

* cited by examiner

SYSTEM AND METHOD FOR RISK CATEGORIZATION

BACKGROUND

The subject matter disclosed herein relates to turbomachinery, and more particularly, discretization of functions indicative of turbomachinery failures.

Turbomachinery may include a turbine, a compressor, and/or a pump. As the turbomachinery operates, efficiency and performance may change over time. This change in performance may be due to various factors such as wear or component damage. This may cause one or more parts of the turbomachinery to degrade in performance resulting in inefficient use of the system and/or downtime due to maintenance. As such, system operators may wish to predict when one or more parts of the turbomachinery system will fail in order to schedule repairs in a timely manner and minimize downtime. However, the system operators may not have access to sufficient data to accurately obtain predictions. Furthermore, information used in such predictions may be proprietary information that an owner of the data may not desire to share with the system operators.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In a first embodiment, a system includes a turbine system including turbomachinery, one or more processors, and a memory storing instructions. When executed by the one or more processors, the instructions are configured to cause the one or more processors to receive an operating parameter of the turbomachinery, and calculate a risk of failure for the turbomachinery based at least in part on an asset failure mode model. The instructions are also configured to cause the one or more processors to categorize the risk of failure as a selected failure indicator category of a plurality of failure indicator categories, and output the selected failure indicator category.

In a second embodiment, a turbine system includes turbomachinery, and a monitoring system further including a display, one or more processors, and a memory storing instructions. When executed by the one or more processors, the instructions are configured to cause the one or more processors to receive an operating parameter of the turbomachinery, and calculate a plurality of risks of failure for the turbomachinery based at least in part on an asset failure mode model. The instructions are also configured to cause the processor to categorize at least one of the plurality of risks of failure as a selected failure indicator category of a plurality of failure indicator categories, and cause the display of the selected failure indicator category via the display.

In a third embodiment, a non-transitory, tangible, and computer-readable medium having stored thereon instructions that, when executed, are configured to cause one or more processors to receive an operating parameter of turbomachinery, and calculate an unreliability of the turbomachinery based at least on the operating parameter. The instructions, when executed, are also configured to cause the one or more processors to discretize the unreliability of the turbomachinery to provide a discretized unreliability, and cause a display of the turbomachinery to display the discretized unreliability. The displayed discretized unreliability communicates a risk of failure of the turbomachinery.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to discretization of failure mode risks(s) given one or more parameters. For example, during the normal operation of turbomachinery, parts may degrade and wear down. To track the reliability of parts, data may be taken on the turbomachinery that may indicate an efficiency and/or health with respect to the turbomachinery as a whole or with respect to individual parts of the turbomachinery. The data may be compiled and analyzed on a local controller and/or a cloud service. Once the data has been analyzed, the local controller and/or cloud service may output an indicator that may signify a risk of failure. In some embodiments, the indicator may be with respect to a current risk of failure (e.g., accumulated risk). In some embodiments, the indicator may be with respect to a future risk (e.g., conditional risk) given predictable operations of the turbomachinery.

Figure 1:
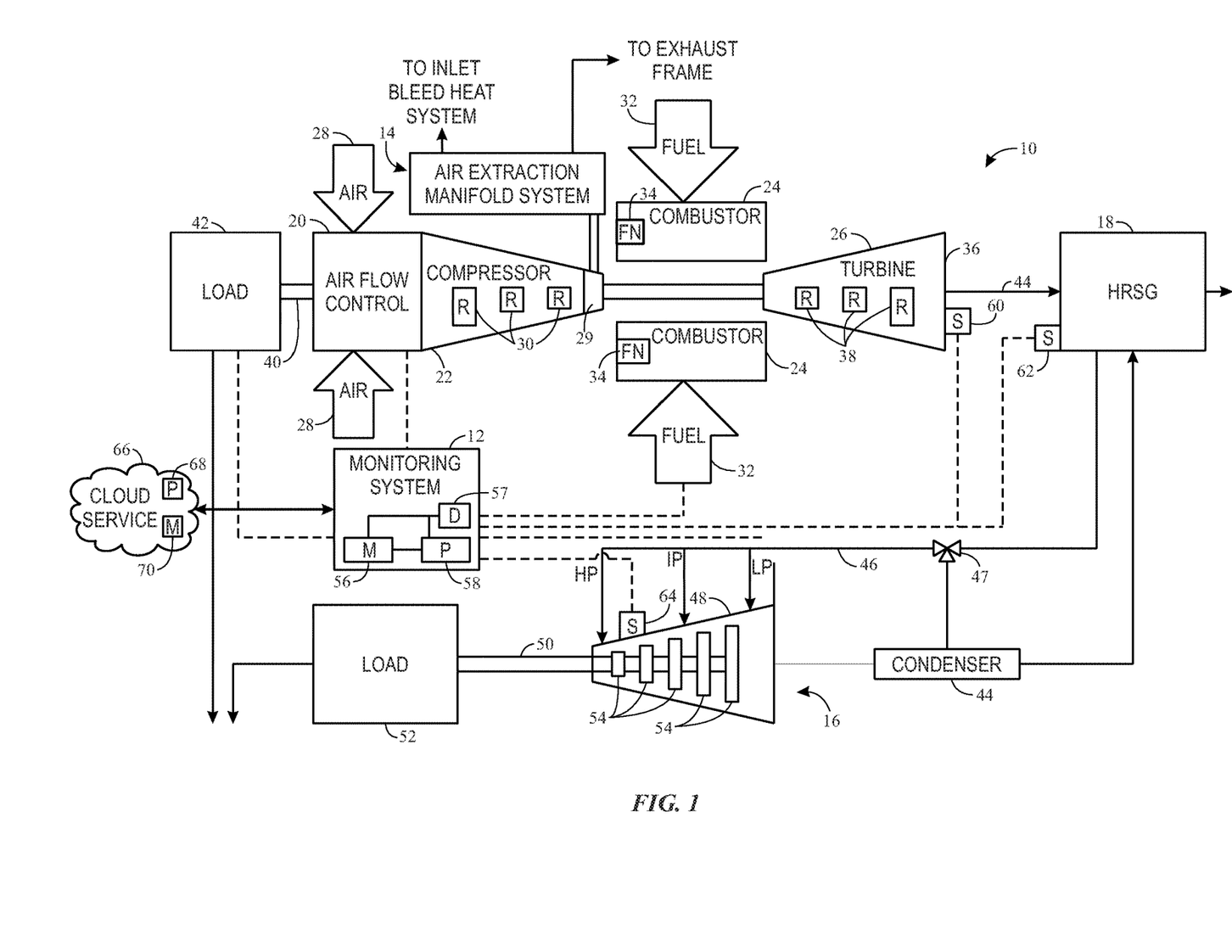
FIG. 1 is a block diagram of an embodiment of a combined cycle power plant (CCPP) having a monitoring system that may analyze and display a risk of failure.

By way of introduction, FIG. 1 is a block diagram of an embodiment of a combined cycled power plant 10 with a monitoring system 12 that may monitor and analyze operations performed by the combined cycle power plant 10. Although the illustrated embodiment pertains to a combined cycle power plant 10, the discussion herein may applicable to any suitable turbomachinery, such as a simple-cycle plant including only a gas turbine or a steam turbine. In some embodiments, the monitoring system 12 may be incorporated into a controller of the combined cycle power plant to control the operations performed by the combined cycle power plant 10, increasing power output or decreasing power output from a gas turbine system 14 and/or a steam turbine system 16.

Keeping this in mind, the combined cycle power plant (CCPP) 10 includes the monitoring system 12, the gas turbine system 14, the steam turbine system 16, and a heat recovery steam generator (HRSG) 18. In operation, the gas turbine system 14 combusts a fuel-air mixture to create torque that drives a load (e.g., an electrical generator). In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load (e.g., an electrical generator). Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the oxidant 28 in a series of compressor stages (e.g., turbine rotor disks 30) with compressor blades. After the oxidant 28 is pressurized, the pressurized air may reside in a compressor discharge chamber 29 before the compressed air exits the compressor 22.

As the compressed air exits the compressor 22, the air enters the combustor 24 and mixes with fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, multiple fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the turbine rotor disks 38. The rotation of the turbine rotor disks 38 induces rotation of shaft 40 and the rotor disks 30 in the compressor 22. A load 42 (e.g., electrical generator) connects to the shaft 40 and uses the rotation energy of the shaft 40 to generate electricity for use by the power grid.

As explained above, the combined cycle power plant 10 harvests energy from the hot exhaust gases exiting the gas turbine system 14 for use by the steam turbine system 16 or a boiler. Specifically, the CCPP 10 channels hot exhaust gases 44 from the turbine system 14 into the heat recovery steam generator (HRSG) 18. In the HRSG 18, the thermal energy in the combustion exhaust gases converts water into hot pressurized steam 46. The HRSG 18 releases the steam in line 46 for use in the steam turbine system 16. Further, the steam in line 46 may be provided at various locations of the steam turbine system 16 depending on pressure of the steam. For example, high pressure (HP) steam may be received by the steam turbine system 16 at a first location, intermediate pressure (IP) steam may be received by the steam turbine system 16 at a second location, and low pressure (LP) steam may be received by the steam turbine system 16 at a third location. Although three locations are illustrated in FIG. 1, any suitable number of locations may be used to feed the steam from the HRSG 18 into the steam turbine system 16.

The steam turbine system 16 includes a steam turbine 48, shaft 50, and load 52 (e.g., electrical generator). As the hot pressurized steam in line 46 enters the steam turbine 48, the steam contacts turbine blades attached to steam turbine rotor disks 54 (e.g., turbine stages). As the steam passes through the turbine stages in the steam turbine 48, the steam induces the turbine blades to rotate the steam turbine rotor disks 54. The rotation of the steam turbine rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam in line 46 passes through the steam turbine 48, the steam loses energy (i.e., expands and cools). After exiting the steam turbine 48, the steam exhaust 51 enters a condenser 49 before being routed back to the HRSG 18, where the steam is reheated for reuse in the steam turbine system 16.

Generally, the monitoring system 12 may include a memory 56, display 57, and a processor 58. The memory 56 includes tangible, non-transitory, computer-readable media that stores instructions and steps written in software code. The display 57 may include a liquid crystal display (LCD), an electroluminescent display (ELD), a cathode ray tube display (CRT), and/or a light emitting diode (LED) display among many other display options for relaying information about the CCPP 10. The processor 58 executes the stored instructions in response to data received from the CCPP 10. More specifically, the monitoring system 12 may be incorporated in a controller that controls and communicates with various components in the CCPP 10 in order to flexibly control the loading of the gas turbine system 14, and thus the loading of the steam turbine system 16. As illustrated, the controller may control the airflow control module 20, the intake of fuel 32, and valve(s) 47; and the monitoring system 12 may communicate with load 42.

The combined cycle power plant 10 may also include various sensors for detecting and/or deriving various conditions within or around the combined cycle power plant 10. For example, the sensors may measure temperatures at various locations using various temperature sensors, such as exhaust gas temperature sensor 60, HRSG steam temperature sensor 62, and steam turbine metal temperature sensor 64, and the like. Additionally or alternative, the sensors of the combined cycle power plant 10 may pertain to other operating parameters, such as pressure, vibration, flow rates, knocks within the combined cycle power plant 10, valve detection (open or closed), speed, stress or strain, and/or other suitable parameters that may be measured indicating operation of the combined cycle power plant 10.

In operation, the controller of the CCPP 10 may control the airflow control module 20 and the consumption of fuel 32 to change the loading of the gas turbine system 14 and thereby the loading of CCPP 10 (i.e., how the CCPP 10 increases electrical power output to the grid). Specifically, the controller adjusts a mass flow rate and temperature of the exhaust gas 44, which controls how rapidly the HRSG 18 produces steam for the steam turbine system 16, and therefore, how quickly the CCPP 10 produces electrical power using loads 42 and 52. For example, when the controller increases the airflow with the airflow control module 20, it increases the amount of airflow flowing through the compressor 22, the combustor 24, and the turbine 26. The increase in airflow increases the mass flow rate of the exhaust gas, and thus increases the torque of the shaft 40. Moreover, the increase in the mass flow rate of the exhaust gas 44 increases the amount of thermal energy available for the HRSG 18 to produce steam (i.e., more exhaust gas is flowing through the HRSG 18). An increase in steam production by the HRSG 18 reduces startup time for the steam turbine system 16 and thus increases electrical output from the load 52.

Although the monitoring system 12 has been described as having the memory 56, display 57 and the processor 58, it should be noted that the monitoring system 12 may include a number of other computer system components to enable the monitoring system 12 to control the operations of the CCPP 10 and the related components. For example, the monitoring system 12 may include a communication component that enables the monitoring system 12 to communicate with other computing systems. The monitoring system 12 may also include an input/output component that enables the monitoring system 12 to interface with users via a graphical user interface or the like.

In some embodiments, the monitoring system 12 may be located locally to the CCPP 10 and/or may be at least partially embodied using a cloud service 66. The cloud service 66 may provide decentralized computing services and file storage. In some embodiments, the monitoring system 12 may be communicatively coupled to the cloud service 66 and a portion of the processes of the monitoring system 12 take place in a cloud service 66. In other words, portions (or all) of the monitoring system processes may be stored in the cloud service 66, be executable in the cloud service 66, and/or accessible via the cloud service 66. Accordingly, the cloud service 66 may have one or more processors 68 and one or more memories 70.

The sensors 60, 62, and 64 of processor 58 from FIG. 1 may relay system input parameters such as measured flows, pressures, temperatures, and/or other suitable measured input parameters from the HRSG 18, steam turbine system 16, gas turbine system 14, and/or other components of the CCPP 10 suitable for analysis. For example, the processor 58 may receive measured flows of steam 46 entering the steam turbine 48 of the steam turbine system 16 as input parameters. Further, as discussed in detail below, the monitoring system 12 may analyze data obtained from the sensors 60, 62, and 64, and other parameters to calculate a probability of failure of one or more turbomachinery parts of the CCPP 10. Furthermore, although the use of the monitoring system 12 is discussed thoroughly with respect to the CCPP 10, the processes of the monitoring system 12 be applied to any suitable turbomachinery part and/or system.

Figure 2:
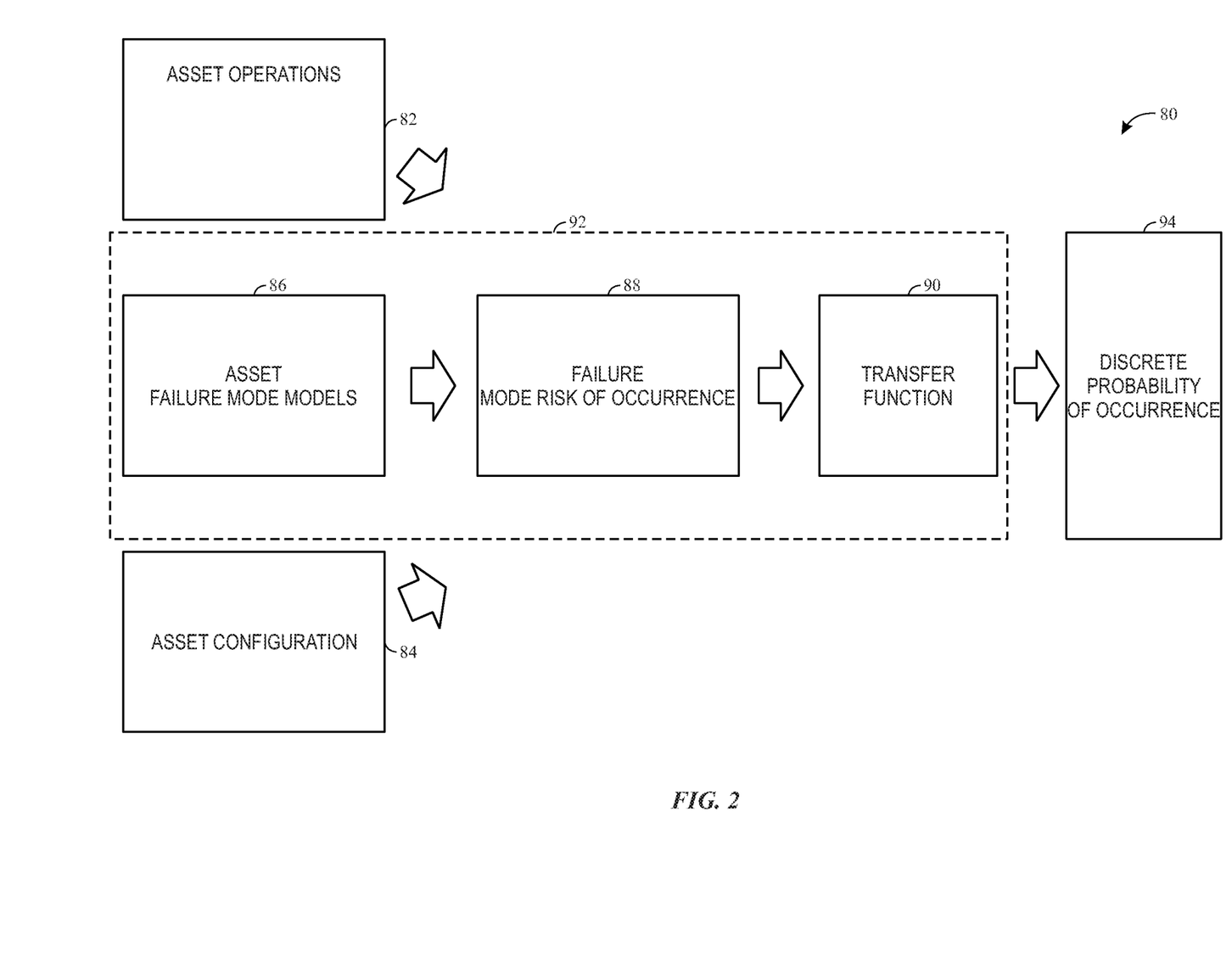
FIG. 2 is a flow diagram of an embodiment of a discretization process performed by the monitoring system of FIG. 1.

FIG. 2 is a flow diagram of an embodiment of a discretization process 80 that may be performed by the monitoring system 12 of FIG. 1. A portion of the discretization process 80 may be representative of a failure mode effects analysis (FMEA) process. When assessing the probability of failure of an asset (e.g., a turbomachinery system/part, a portion/all of the CCPP 10, etc.), several factors may be taken into account. For example, asset operations 82, asset configuration 84, and asset failure mode models 86 may be considered. Asset operations 82 may include operating conditions such as what setting the asset is operating at (e.g., full load conditions, partial load conditions, target temperatures, blade angles, steam cycle settings, etc.). Asset operations 82 may also include factors such as total operating hours, a number starts, an overall age of the asset, hot gas path temperatures, steam cycle settings, and/or gas turbine system settings. In some embodiments, asset operations 82 may further include parameters of the environment of the asset. For example, asset operations 82 may include ambient pressure, temperature, and/or humidity of the surrounding environment.

The configuration of the asset (e.g., asset configuration 84) may also be considered when assessing the probability of failure. Asset configuration 84 data may include information regarding a set-up (e.g., configuration) of the asset. For example, in the case of the CCPP 10, asset configuration 84 may include the number of blade stages in a compressor and/or turbine, a combustor configuration, intake ratio of air/fuel, a load type/size etc. Asset configuration 84 may indicate the consequences of failure of a part. For example, if a first part fails, the asset configuration 84 may indicate which other parts will fail as a consequence of the failure of the first part.

Further, determination of the probability of failure (e.g., unreliability) may be based at least in part on asset failure mode models 86. Asset failure mode models 86 may include modes of failure of the asset and indicate a likely cause of failure. For example, in the case of a compressor, the failure mode models may refer to models of blade degradation, blade migration, fluid leaks, cracks/tears, etc. The asset failure mode models 86 may be based on empirical data associated with failure modes for the turbomachinery part/system. The asset failure mode models 86 may have also been obtained through experimentation, and other known methods for determining failures of parts. For example, the parameters associated with asset operations 82 (e.g., full load conditions, partial load conditions, total operating hours, number of starts, overall age, hot gas path temperatures, steam cycle settings, gas turbine system settings, ambient pressure, ambient temperature, and/or ambient humidity) may affect a cause of failure. For example, a more humid climate may cause turbomachinery parts to corrode faster than milder climates. Similarly, the asset configuration 84 may have some effect on the asset failure mode models 86. For example, if turbomachinery is operating at a partial-load condition for extended periods of time, parts of the turbomachinery may experience more vibration, thereby increasing the chances of failure. Indeed, in some embodiments, the asset failure mode models 86 may be based on operating parameters gathered regarding asset operations 82 and asset configurations 84.

Aside from the operating parameters discussed above, the asset failure mode models 86 may also be determined based on information gathered from sensors (e.g., sensors 60, 62, and 64), empirical data-based models, and/or physics-based models. For example, a sensor may measure operating parameters such as vibration of a part and flow in a part. The asset failure mode models 86 may be utilized to relate the operating parameters (e.g., vibration and flow) to parameters of unreliability (e.g., wear and leakage).

In some embodiments, the asset failure mode models 86 may utilize empirical data-based models and/or physics-based models to relate the operating parameters to unreliability. Empirical data may include data gathered through observation and/or experimentation. Empirical data may indicate, for a given failure mode, how much time the part has until failure is expected. For example, at the onset of a crack in a compressor blade, empirical data may provide a time estimation until the crack has fully propagated through the compressor blade, resulting in a failure. Similarly, physics-based models may be utilized to estimate crack propagation given a force caused by rotation of the compressor shaft, and forces caused by compression of the gas flowing through the compressor.

Based at least in part on asset failure mode models 86, a failure mode risk of occurrence 88 may be determined to predict the risk of failure relative to an operating parameter. In some embodiments, the failure mode risk of occurrence 88 may utilize a probability density function (e.g., a Weibull distribution function). In some embodiments, the failure mode risk of occurrence 88 utilizes other transfer functions. For example, as discussed further in the description of FIG. 3, the failure mode risk of occurrence 88 may be determined using a function representing a failure mode probabilities (e.g., asset failure mode models 86) with respect to unreliability and an operating parameter, such as a number of starts, hours in operation, an age of components, or other suitable operating parameters (e.g., firing temperatures, vibration, operation settings, etc.). In some embodiments, the failure mode risk of occurrence 88 may be determined using any suitable transfer function that properly models the risk of failure (e.g., unreliability) with respect to an operating parameter and/or other information about one or more parts of the combined cycle power plant 10. In some embodiments, the constants and variables used to determine the failure mode risk of occurrence 88 may be at least partially estimated/calculated based at least on the asset operations 82, asset configurations 84, and asset failure mode models 86. A graphical embodiment of a function used to determine the failure mode risk of occurrence 88 may be seen in FIG. 3.

Figure 3:
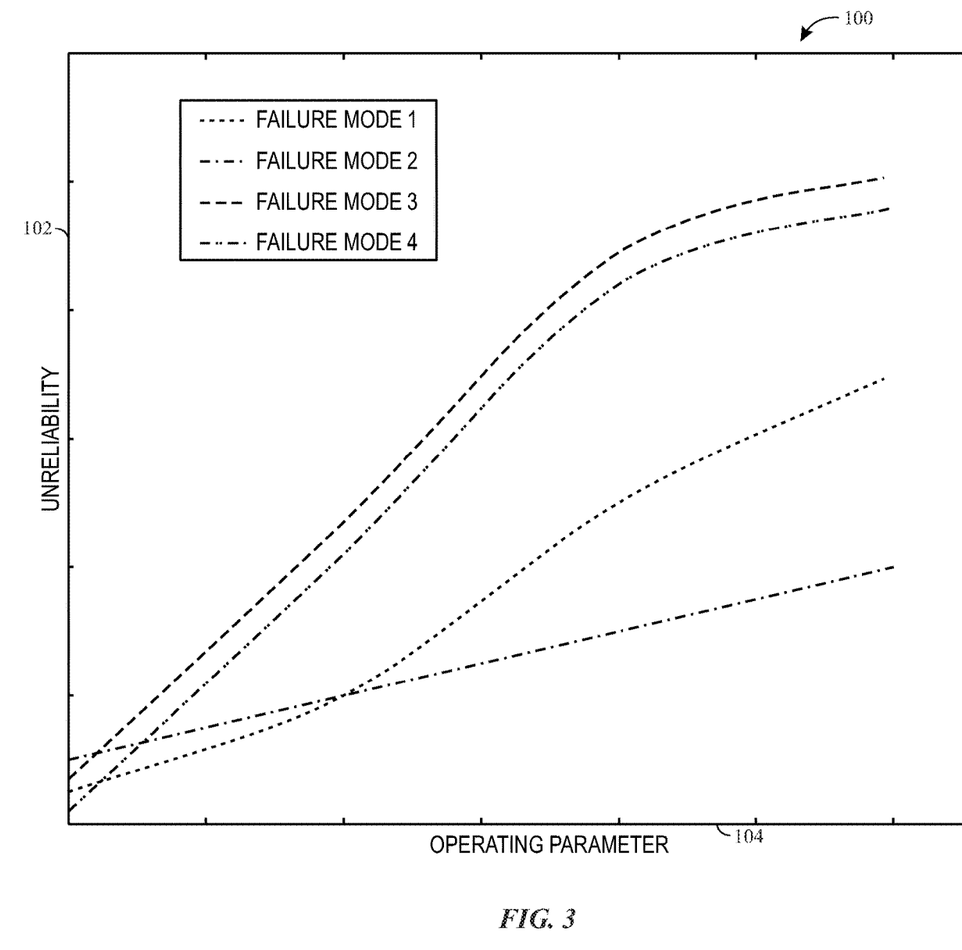
FIG. 3 is a graphical display of an embodiment of a risk of failure that the monitoring system of FIG. 1 may analyze.

As previously discussed, FIG. 3 is a graphical display 100 of an embodiment of the failure mode risk of occurrence 88. In the current embodiment, the graphical display 100 represents multiple failure modes (e.g., failure modes one to four). As discussed above, the failure modes may be associated with reasons a part and/or a machine may fail. In the case of a compressor, failure modes may be, for example, a seal leak, blade migration, blade cracks, etc. The failure modes may be modeled with respect to unreliability 102 and an operating parameter 104. In the current embodiment, the unreliability 102 is represented on the Y-axis and the operating parameter 104 is represented on the X-axis. The unreliability 102 may be expressed as a percentage. For example, zero to ten percent may represent a very low probability of failure (e.g., low risk) and ninety to 100 percent may represent a very high probability of failure (e.g., high risk). The operating parameter 104 may be any suitable parameter that may be correlated to failure. In some embodiments the operating parameter 104 may be a number of starts, a number of hours in operation, an age of a component/system, etc. In some embodiments, the operating parameter 104 may be a temperature, a pressure, an efficiency, steam cycle setting, gas turbine setting, and/or the like. In some embodiments, the operating parameter 104 may be obtained from measurements taken directly from sensors (e.g., sensors 60, 62, 64) and/or may be derived indirectly from other measurements.

As seen in FIG. 3, the unreliability 102 of a failure mode may generally increase as an operating parameter increases. For example, as a turbomachinery part continues to operate (e.g., increases in hours of operation), the turbomachinery part may be more likely to fail. Further, in some embodiments, reliability may be related to an operating parameter. Reliability may inversely compare to unreliability. As discussed above, the relationship of unreliability (or inversely, reliability) to an operating parameter may be a representation of the failure mode risk of occurrence 88.

In some embodiments, the relationship of unreliability to an operating parameter may be utilized in assessing a current risk of failure at a current operating parameter data point (e.g., operating hours, number of starts). Additionally, or alternatively, the relationship of unreliability to an operating parameter may be utilized in assessing a risk of failure at a future operating parameter data point. In other words, processes of the monitoring system and/or the cloud service may assess an accumulated risk and/or may assess a conditional risk of a part/system.

As previously discussed, the failure mode risk of occurrence 88 may be discretized through a discretization function 90. Returning to FIG. 3 and previously discussed, the failure mode risk of occurrence 88 may be utilized to relate failure modes to an operating parameter and unreliability. The risk of occurrence 88 may be a continuous distribution function (e.g., Weibull distribution). The failure mode risk of occurrence 88 may be expressed as a percentage (e.g., zero to 100 percent) of unreliability (e.g., risk of failure) as it relates to an operating parameter (e.g., operating hours, number of starts, age, operation setting, firing temperatures, power output, etc.). Accordingly, the discretization function 90 may simplify the continuous distribution function (e.g., the failure mode risk of occurrence 88) by categorizing (e.g., discretizing) predicted unreliability of the failure modes into failure indicator categories (e.g., failure indicator categories 122). This simplification into discrete categories provide easily understood indicators in a way that does not disclose the underlying methodologies used to determine the failure mode risk of occurrence. Furthermore, the discrete categories may at least partially conceal actual values for the failure mode risk of occurrence 88 allowing the use of proprietary data without providing an ability to reverse engineer the failure mode risk of occurrence 88 and/or the transfer functions to determine the failure mode risk of occurrence 88.

In some embodiments, the failure indicator categories may be visually represented by a number (e.g., one to five), a color, a pattern, one or more words (e.g., low-risk, high-risk), a sound, etc. Accordingly, the failure indicator categories may represent low to high risks of failure. For example, a low risk of failure may be represented by a one, a green color, etc. and a high risk of failure may be represented by a five, a red color, etc.

As discussed below with respect to FIG. 4, the discretization function 90 may simplify the failure mode risk of occurrence 88 by assigning (e.g., categorizing, collating) ranges (e.g., percentage ranges) of unreliability to one or more failure indicator categories.

In some embodiments, sensitivity of the categorization process may be based on a severity (e.g., degree) of failure for a part. For example, a more-critical component of turbomachinery having a high severity of failure may be categorized with high sensitivity and a less-critical component of turbomachinery having a low severity of failure may be categorized with low sensitivity. Thus, in some embodiments, the more-critical component may be categorized into a high-risk failure category (e.g., a five, a red color, etc.) if the more-critical component is associated with a certain unreliability (e.g., thirty percent). Similarly, if a less-critical component is associated with the same unreliability (e.g., thirty percent), the less-critical component may be categorized into a lower-risk failure category (e.g., a two, a blue color, etc.). In some embodiments, severity of failure for a part may be based on a downtime, costs of downtime, and/or a repair cost in event of failure for the part.

In some embodiments, the discretization function 90 may group weighted unreliabilities of multiple components together for an overall system unreliability. For example, multiple components (e.g., blade, shaft, valve, etc.) may have multiple failure modes with associated unreliabilities. As such, an unreliability of a system (e.g., combined cycle power plant 10) and/or of a subsystem (e.g., the compressor 22) may be calculated based at least on weighted unreliabilities of its components. Similar to the sensitivity of categorization process above, critical components of a system may be weighted more heavily than less-critical components of the system when calculating the unreliability of the system. Thus, critical components of a system may have a greater influence on the system unreliability than less-critical components of the system. The overall system unreliability may subsequently be categorized into a failure indicator category as discussed above.

In some embodiments, if the discretization function 90 categorizes one or more parts/system into a failure indicator that represents a high risk of failure, an event may be triggered. For example, if a part/system has a high unreliability (e.g., a high-risk failure indicator category), a repair/maintenance event may be scheduled. In some embodiments, if a part/system has been categorized to have a high unreliability (e.g., a high-risk failure indicator category), the monitoring system 12 may recommend an alternate setting of the turbomachinery. The alternate setting may lower the unreliability of the part/system. In some embodiments, recommending the alternate setting may include recommending a lower power output and/or a higher power output for the turbomachinery.

Further, as previously discussed, the asset failure mode models 86, the failure mode risk of occurrence 88, and the discretization function 90 may be considered proprietary information 92. Information/data/processes of the proprietary information 92 that is located in the monitoring system 12, or remotely in the cloud service 66, may be locked, encrypted, safeguarded, etc. In some embodiments, the proprietary information 92 may be complicated and inconvenient to a user. As such, the proprietary information 92 may be discretized as discussed above to communicate a risk of failure in a user-friendly form.

Overall, the discretization function 90 may translate the failure mode risk of occurrence 88 to a discrete probability of occurrence 94. An example of the discrete probability of occurrence 94 may be seen in FIG. 4 (e.g., failure risk indicator 120. The discrete probability of occurrence 94 may be a user-friendly visual representation of the failure mode risk of occurrence 88 of a part/system. As discussed in further detail below, the discrete probability of occurrence 94 may be visually represented by discrete failure indicator categories as discussed above and in further detail below with respect to FIG. 4.

Figure 4:
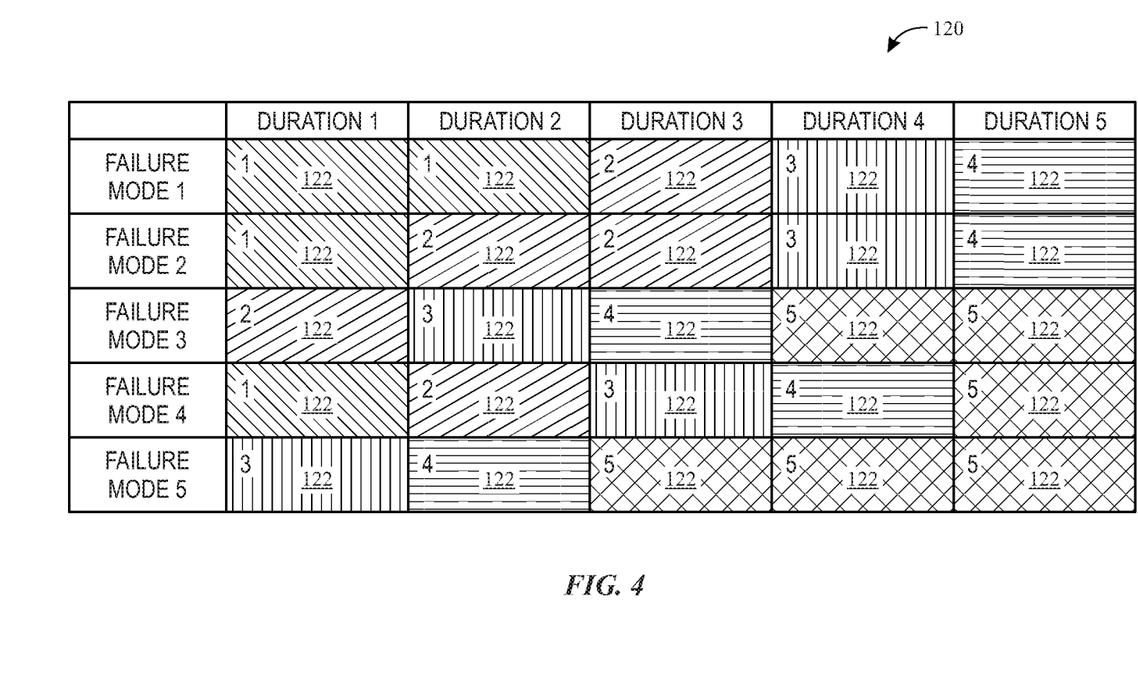
FIG. 4 is an embodiment of a risk of failure indication displayed via the monitoring system of FIG. 1.

As previously noted, FIG. 4 is an embodiment of a failure risk indicator 120 that may be displayed via the display 57 of the monitoring system 12 of FIG. 1. The failure risk indicator 120 may be an embodiment of the discrete probability of occurrence 94 that indicates a probability of failure for a given failure mode. The failure risk indicator 120 may communicate the probability of a failure to an operator if a part/system continues at a current level of operation. Similar to the graphical representation 100 of FIG. 3, the risk of failure indicator 120 may relate a probability of a failure mode occurrence to an interval (e.g., duration 1, 2, 3, 4, 5). For example, the failure risk indicator 120 may relate a probability of a failure mode to occur given certain intervals (e.g., time segments, number of starts, an age of the part/system, an hours in operation, or any combination thereof).

As discussed above with respect to the discrete probability of occurrence 94, the failure risk indicator 120 may have various methods of communicating a probability of failure. As discussed above, the probability of failure may be communicated through a failure indicator category 122 (e.g., a visual indicator, a category indicative of risk, unreliability, probability of failure, etc.). In the current embodiment, the failure risk indicator 120 displays the failure indicator category 122 with a number (e.g., one to five) and an associated pattern. In some embodiments, the failure risk indicator 120 may display the failure indicator category 122 with a number, an indicative color, a pattern, or any combination thereof. In some embodiments, the monitoring system 12 may have a threshold that causes an alarm if the failure risk indicator 120 displays a threshold level of failure indicator category 122. For example, the monitoring system may sound an alarm if the failure indicator category 122 reaches a four out of five. In some embodiments, this threshold is set by receiving a selection of the threshold value.

The failure indicator categories 122 (e.g., a number, a pattern, a color) may be directly related to percentage segments of unreliability (e.g., unreliability 102) modeled with a transfer function (e.g., e.g., failure mode risk of occurrence 88). For example, zero to twenty percent unreliability may correspond to a failure indicator category 122 represented by a one, a green color, a first design, or any combination thereof twenty-one to forty percent unreliability may correspond to a failure indicator category 122 represented by a two, a blue color, a second design, or any combination thereof. This trend may continue with equally sized segment through to eighty-one to 100 percent unreliability, which may correspond to a failure indicator category 122 represented by a five, a red color, a fifth design, or any combination thereof. Indeed, the various segments of unreliability may utilize various customizable failure indicator categories 122 (colors, patterns, pictures, sounds, etc.). Moreover, the percentage ranges of unreliability may also have non-equally sized segments ranges. For example, the percentage ranges of unreliability may utilize a first failure indicator category 122 (e.g., color, pattern, picture, sound, etc.) for zero to five percent, a second failure indicator category 122 for six to thirty-five percent, a third failure indicator category 122 for thirty-six to forty-five percent, etc.

Furthermore, although many features (e.g., an indicator, a range of unreliability, alarms, etc.) of the risk of failure risk indicator 120 has been discussed above as customizable, these features may also come preset by a manufacturer and may not be customizable.

As previously discussed, a sensitivity of the risk of failure risk indicator 120 may be adjusted based on a severity of a failure. Sensitivity of the risk of failure risk indicator 120 may refer to a percentage range of unreliability that is associated with a failure indicator category 122 (e.g., one to five). A high sensitivity may correspond to a small percentage range of unreliability (e.g., one percent unreliability may correspond to a failure indicator category 122 of one, and five percent unreliability may correspond to a failure indicator category 122 of two). Conversely, a low sensitivity may correspond to a large percentage range of unreliability (e.g., one percent unreliability may correspond to a failure indicator category 122 of one, and twenty percent unreliability may correspond to a failure indicator category 122 of two). For example, a more critical part/system (e.g., a part/system that may have extended downtime and/or will have a high repair cost in the event of failure) may have a higher sensitivity than a less important part/system (e.g., a part/system that may have little to no downtime and/or will have a low repair cost in the event of failure). Further, in some embodiments, the sensitivity may be adjusted based on whether the failure mode corresponds to a single part or a large system. For example, in some embodiments, the smaller the part indicated, the lower the sensitivity.

In the current embodiment, the failure risk indicator 120 displays multiple failure indicator categories 122 relative to multiple failure modes. In some embodiments, the failure risk indicator 120 corresponds to multiple parts. In some embodiments, the failure risk indicator 120 may display only a single failure indicator category 122 relative to a system (e.g. CCPP 10). The failure indicator category 122 of the system may take into account weighted risks of multiple failure modes of multiple parts. For example, as previously discussed, a failure mode of a more important part may be weighted more heavily on the failure indicator category 122 relative to the system. Similarly, a failure mode of a less critical part may be weighted less heavily on the failure indicator category 122 relative to the system.

Furthermore, as discussed above, it should be noted that the failure risk indicator 120 may display the failure indicator category 122 with respect to various points in time. In some embodiments, the failure indicator category 122 may refer to a current risk (e.g., an accumulated risk). However, in some embodiments, the failure indicator category 122 may refer to a risk at a future time (e.g., a conditional risk). In some embodiments, an operator may select an option for the failure risk indicator 120 to display the accumulated risk and/or the conditional risk.

Figure 5:
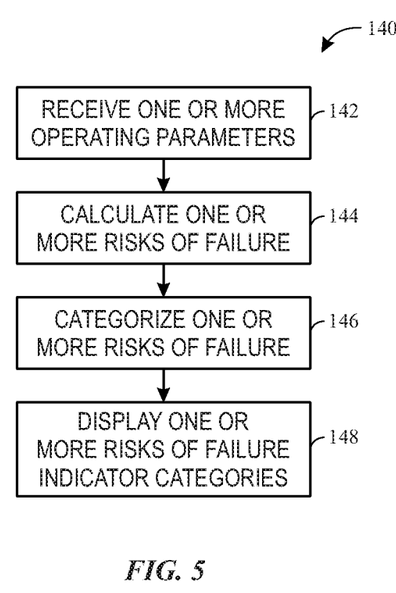
FIG. 5 is a flow chart of an embodiment of a process to analyze and display a risk of failure of a portion of the CCPP of FIG. 1.

FIG. 5 is a flow chart of an embodiment of a discretization process 140 that may be utilized by a processor of turbomachinery (e.g., the processor 58 of the CCPP 10). The processor may receive one or more operating parameters (block 142). As discussed above, the operating parameters may be an operational setting (e.g., full load mode, part load mode, etc.), a number of operating hours, an online time, a number of startups, an age of the component/system, a factor of the environment (e.g., humidity, pressure, temperature, etc.), a geolocation, and any other number of suitable operating parameters that may be related to a health of a part/system such as a firing temperature, vibration, liquid/gas flow, power output, etc. In some embodiments, the one or more operating parameters may be measured (e.g., from sensors 60, 62, and 64). In some embodiments, the one or more operating parameters may be determined through utilization of a model, known physical relationships with directly measured information, calculation, and/or other suitable parameter computation mechanisms.

A processor of turbomachinery (e.g., the processor 58 of the CCPP 10) may calculate one or more risks of failure (block 144). As previously discussed, the one or more risks of failure may be calculated through utilization of a model (e.g., asset failure mode models 86). In some embodiments, the one or more risks of failure may be calculated utilizing a probability distribution function (e.g., failure mode risk of occurrence 88, Weibull distribution, etc.). For example, the processor of turbomachinery may correlate an operating parameter to unreliability (e.g., probability of failure) utilizing the model and/or probability distribution function. The model and/or probability distribution function may utilize empirical-based data and/or physics-based data to correlate the operating parameters to unreliability.

The processor of turbomachinery (e.g., the processor 58 of the CCPP 10) may categorize the one or more risks of failure (block 146). Categorization of the one or more risks of failure may be as described above with respect to the discretization function 90. For example, categorization of the one or more risks of failure may utilize various sensitivities and weighted unreliabilities based on a degree of failure. Also as discussed above, categorization of the one or more risks may also be based on an accumulated risk or a conditional risk.

A processor of turbomachinery (e.g., the processor 58 of the CCPP 10) may display one or more risks of failure indicator categories based at least on the categorization of the one or more risks of failure (block 148). The one or more risks of failure indicator categories may be as described above with respect to the failure indicator categories 122. In some embodiments, the risks of failure indicator categories may be displayed via a display of the turbomachinery (e.g., the display 57 of the CCPP 10). In some embodiments, multiple failure indicator categories with respect to unreliability of multiple parts/systems may be displayed. In some embodiments, a single failure indicator category with respect to unreliability of a single system may be displayed. In some embodiments, a certain failure indicator category may trigger an event. For example, if a failure indicator category indicates a high level of unreliability, a repair/maintenance event may be scheduled for the part/system associated with the high level of unreliability.

Technical effects of the invention include providing a risk of failure indication to operators of turbomachinery (e.g., a combined cycle power plant, a gas turbine system, a steam turbine system, etc.). The risk of failure indication may communicate an unreliability (e.g., a risk of failure). The unreliability may be communicated through discrete indicators (e.g., failure indicator category 122) representing a probability of failure. The discrete indicators may be derived via discretization of a risk of occurrence and/or failure mode models. The discretization may be based on various turbomachinery component failure weights and sensitivities. The discrete indicators may be displayed to the operator in a number of ways.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A turbine system comprising:
 turbomachinery;
 one or more processors;

memory storing instructions that, when executed by the one or more processors, are configured to cause the one or more processors to:
receive an operating parameter of the turbomachinery;
calculate a risk of failure for the turbomachinery based at least in part on an asset failure mode model, wherein the calculated risk of failure varies based on a degree of consequence of the failure;
categorize the risk of failure as a selected failure indicator category of a plurality of failure indicator categories; and
output the selected failure indicator category.

2. The turbine system of claim 1, wherein the instructions are configured to cause the one or more processors to:
schedule a maintenance event based at least in part on the selected failure indicator category.

3. The turbine system of claim 1, wherein the operating parameter comprises an indication of a setting of the turbomachinery.

4. The turbine system of claim 3, wherein the instructions are configured to cause the one or more processors to:
recommend an alternative setting of the turbomachinery that corresponds to a lower failure indicator category of the plurality of failure indicator categories.

5. The turbine system of claim 3, wherein the setting comprises a partial load condition, a full load condition, target temperatures within the turbomachinery, blade angles, steam cycle settings, or any combination thereof.

6. The turbine system of claim 1, wherein receiving the operating parameter comprises receiving sensor data from a sensor associated with the turbomachinery.

7. The turbine system of claim 1, wherein the output of the selected failure indicator category comprises a visual indicator that indicates a severity of the risk of failure.

8. The turbine system of claim 1, wherein calculating the risk of failure comprises calculating separate risks of failure at two or more intervals, categorizing the risk comprises categorizing each of the separate risks of failure, and outputting the selected failure indicator category comprises outputting indicators for each of the separate risks of failure.

9. The turbine system of claim 8, wherein the interval is based on operating hours, number of starts, age of components of the turbomachinery, or a combination thereof.

10. The turbine system of claim 1, wherein the asset failure mode model comprises an empirical data-based model, a physics-based model, or a combination thereof.

11. The turbine system of claim 1, wherein the one or more processors are located in a cloud service or a combination of the cloud service and a computer local to the turbomachinery.

12. A turbine system comprising:
turbomachinery;
monitoring system comprising:
a display;
one or more processors;
memory storing instructions that, when executed by the one or more processors, are configured to cause the one or more processors to:
receive an operating parameter of the turbomachinery;
calculate a plurality of risks of failure for the turbomachinery based at least in part on an asset failure mode model, wherein the calculation of the plurality of risks of failure varies based on a degree of consequence of a respective failure of the plurality of risks of failure;
categorize at least one of the plurality of risks of failure as a selected failure indicator category of a plurality of failure indicator categories; and
cause the display of the selected failure indicator category via the display.

13. The turbine system of claim 12, wherein the operating parameter comprises an online time of the turbomachinery, a number of starts of the turbomachinery, a geolocation of the turbomachinery, an environment of the turbomachinery, sensed values related to an operation of components of the turbomachinery, or a combination thereof.

14. The turbine system of claim 12, wherein the plurality of risks of failure comprises a risk of failure for each of a plurality of components of the turbomachinery, a total risk of failure of the turbomachinery, a risk of failure of groups of the components of the turbomachinery, or a combination thereof.

15. The turbine system of claim 12, wherein a scale of categorization of the plurality of risks of failure is different between components of the turbine system and the turbine system as a whole.

16. The turbine system of claim 12, wherein the plurality of risks of failure indicates a conditional risk and/or an accumulated risk.

17. They turbine system of claim 12, wherein a transfer function is used to calculate the plurality of risks of failure.

18. A non-transitory, tangible, and computer-readable medium having stored thereon instructions that, when executed, are configured to cause one or more processors to:
receive an operating parameter of turbomachinery;
calculate an unreliability of the turbomachinery based at least on the operating parameter;
discretize the unreliability of the turbomachinery to provide a discretized unreliability, wherein the discretized unreliability varies based on a degree of consequence of a failure of the turbomachinery; and
cause a display of the turbomachinery to display the discretized unreliability, wherein the displayed discretized unreliability communicates a risk of failure of the turbomachinery.

19. The non-transitory, tangible, and computer-readable medium of claim 18, wherein the operating parameter comprises at least one of a number of starts of the turbomachinery, a number of operating hours of the turbomachinery, an age of the turbomachinery, or a load condition of the turbomachinery.

20. The non-transitory, tangible, and computer-readable medium of claim 18, wherein calculation of the unreliability of the turbomachinery is based on a calculation of reliability of components of the turbomachinery.

* * * * *